Figure 1:
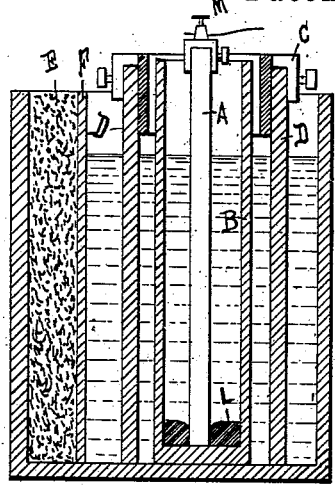

T. L. KAUFFER.
ELECTRIC BATTERY.

No. 328,687. Patented Oct. 20, 1885.

WITNESSES
William C. Goldney
W. E. Barry

INVENTOR
Theodore L. Kauffer
By his Attorney

UNITED STATES PATENT OFFICE.

THEODORE L. KAUFFER, OF BOSTON, ASSIGNOR TO W. B. H. DOWSE, TRUSTEE, OF NEWTON, MASSACHUSETTS.

ELECTRIC BATTERY.

SPECIFICATION forming part of Letters Patent No. 328,687, dated October 20, 1885.

Application filed July 11, 1885. Serial No. 171,305. (No model.)

*To all whom it may concern:*

Be it known that I, THEODORE L. KAUFFER, a citizen of the United States, residing at Boston, in the county of Suffolk and Commonwealth of Massachusetts, have invented certain new and useful Improvements in Electric Batteries, of which the following is a full and complete specification.

My invention relates to an improvement in galvanic batteries, by which they are, in addition to other purposes, adapted for use in connection with the incandescent electric light.

My invention consists, principally, in the production of a new depolarizing fluid, or in the combination with the other element of an electric battery, of bichromate of soda. I have shown in the drawings an outer cell provided with a reservoir. This feature, however, is not an essential or important part of my invention.

My invention also consists of a ring or clamping device to hold in position the carbon plates or negative element of the battery. By this means I am enabled to position the carbon plates close to the porous cup and so decrease the internal resistance caused by obliging the electric current to pass through a large amount of fluid. I do not, however, consider this an essential feature of my invention.

Figure 2:
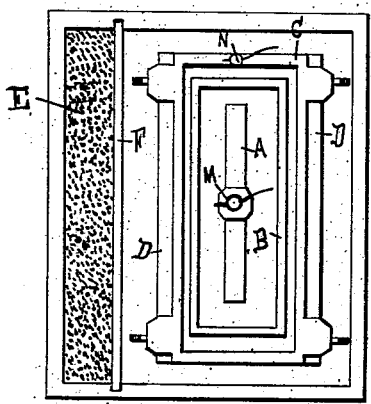
Figure 3:
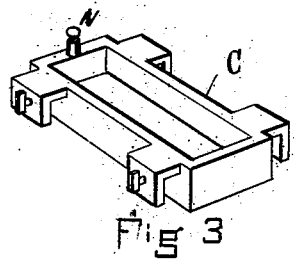

In the accompanying drawings, Figure 1 is a vertical section of the cell. Fig. 2 is a horizontal view of the same. Fig. 3 is a perspective view of the ring by which the carbon plates are held in place.

Referring to Figs. 1 and 2, A is the positive element—a slab of zinc. This is immersed in a solution composed of one part sulphuric acid to five parts of water contained in the rectangular porous jar B. In the bottom of this cup is placed a small amount of mercury, which serves to keep the zinc well amalgamated and so prevent waste.

The porous cup B sets in the main jar E F, which is preferably composed of glazed earthenware, though it may be made of any suitable material, such as vulcanite or glass. This jar is partially filled with the following fluid mixture, preferably of the following proportions: bichromate of soda, four pounds; sulphuric acid, twelve pounds; water, six pounds. While I could use other acids, I preferably use sulphuric acid.

At one side of the jar is the reservoir E, which is separated from the rest of the cell by the partition F, which is composed of some porous material, preferably of earthenware, (unglazed,) and is so arranged as to slide out and in for convenience in cleaning the jar. In this reservoir is placed a quantity of the dry crystals of bichromate of soda, which will be leached out by the fluid in the adjoining cell, and, passing through the porous partition, continually replenish that fluid and keep it in a state of concentration.

At D D is shown the negative element of the cell, composed of two plates of carbon connected by the ring C. The ring C is also shown in detail in Fig. 3. It will be observed that each plate is firmly attached to the ring C by clamping-screws arranged for that purpose. In order to prevent the corrosion of the connection the carbon plates are treated as follows:

The carbon is heated to a point slightly higher than the melting-point of paraffine and the melted paraffine then applied with a brush to the upper end of the carbon only. The carbon is then allowed to cool. When partially cool, the plate is rubbed with solid paraffine, the object being to form a superficial coat which will extend sufficiently deep to insure its firm adherence to the plate, and yet leave the conductivity of the central part of the carbon unimpaired. The thickness of the coating need be only sufficient to form a glaze upon the surface of the carbon. Stearine, wax, or any similar non-conducting substance may be used instead of paraffine.

It will be observed that in the accompanying drawings I have made my cell square. This is done in order to economize space, as the battery is intended to be put up in groups of ten cells each. It does not, however, form an essential part of my invention.

Bichromate of soda is a very desirable material as an element in electric batteries, as it is extremely soluble, contains a large per cent. of chromic acid, and is quite inexpensive in comparison with other material. Likewise the salt which is produced by the reduction of the bichromate of soda is very soluble; in fact, it is difficult to cause it to crystallize at all. This last fact is an important feature in the action of the bichromate of soda, as it does away with the labor of cleaning the battery consequent upon the crystallizing of the salts now in use on the electrodes and porous cup, and allows the bichromate of soda to be exhausted. The element bichromate of soda allows me to obtain the most desirable galvanic results, great electro-motive force, quantity, and constancy. In a bichromate-of-potash battery it is a well-known defect that it clogs up and ceases to work before its chemicals are exhausted. This is not true in my improved battery.

I am aware that it has been proposed to use crystals of trichromate of soda, prepared in a certain manner, in connection with the zinc element in a perforated porous cup of a battery. This, however, if possible, exhausts the zinc and acids and requires a frequent cleaning of the battery.

I claim as my invention—

1. The combination, in a galvanic battery, of bichromate of soda with an acid, preferably sulphuric acid.

2. In a galvanic battery, a fluid one element of which is bichromate of soda.

3. The combination, in a galvanic battery, of electrodes, a mixture of bichromate of soda, sulphuric acid, and water, as set forth.

4. A galvanic battery having a reservoir with a slotted partition, a mixture of bichromate of soda, sulphuric acid, and water, the elements A in a cell, B, and the elements D D, connected by a ring, C, as set forth.

5. In a galvanic battery, the ring C, provided with arms and clamping-screws, in combination with the plates D D, substantially as described.

6. A galvanic battery consisting of an outer cell, an inner porous cup, a positive and negative electrode, bichromate of soda, and an acid, preferably sulphuric acid, in aqueous solution.

In witness whereof I have hereunto set my hand.

THEODORE L. KAUFFER.

Witnesses:
WM. B. H. DOWSE,
WILLIAM C. GOLDNER.